Sept. 28, 1965     H. L. HOSTERMAN, JR., ETAL     3,208,341
SCREEN FOR STEREO VIEWER
Filed June 7, 1962     6 Sheets-Sheet 1
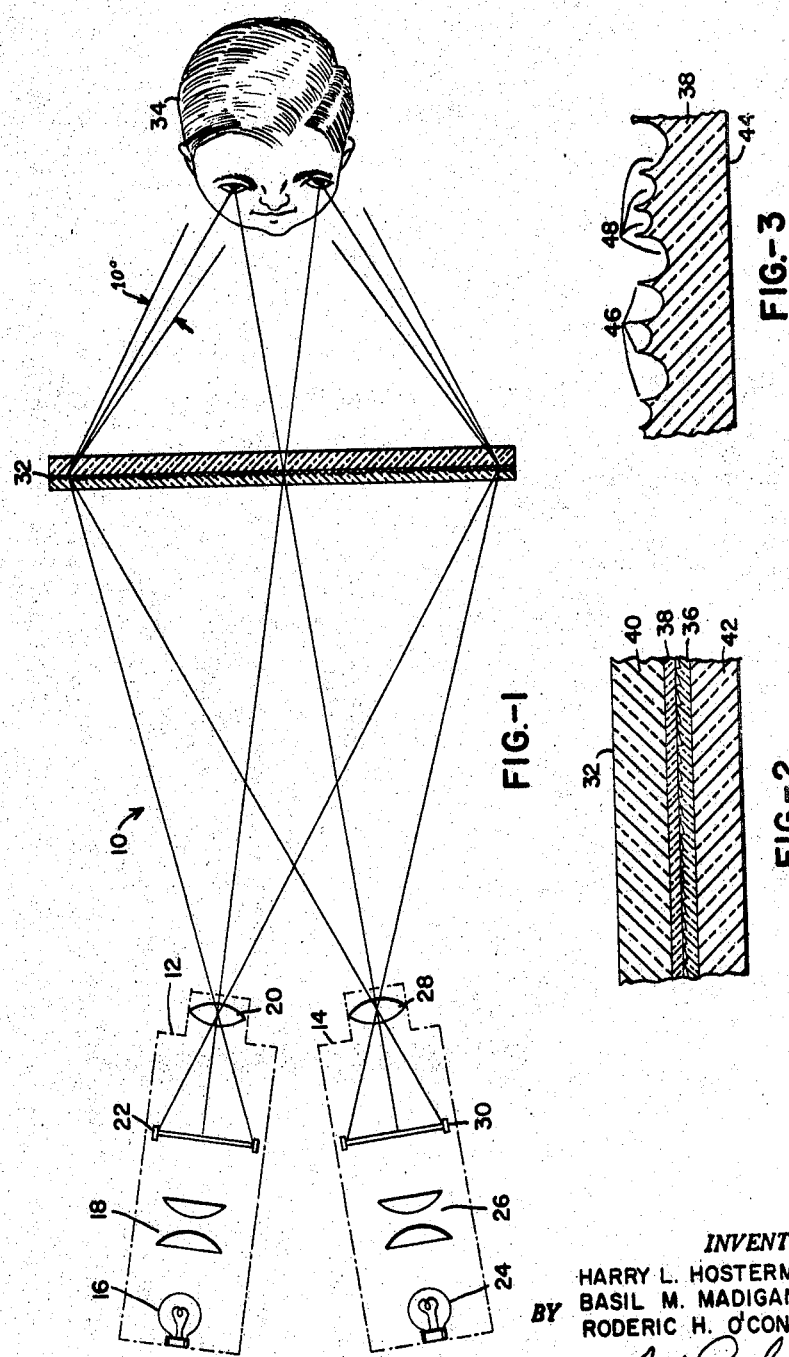
INVENTORS.
HARRY L. HOSTERMAN JR.
BY BASIL M. MADIGAN
RODERIC H. O'CONNOR
ATTORNEY

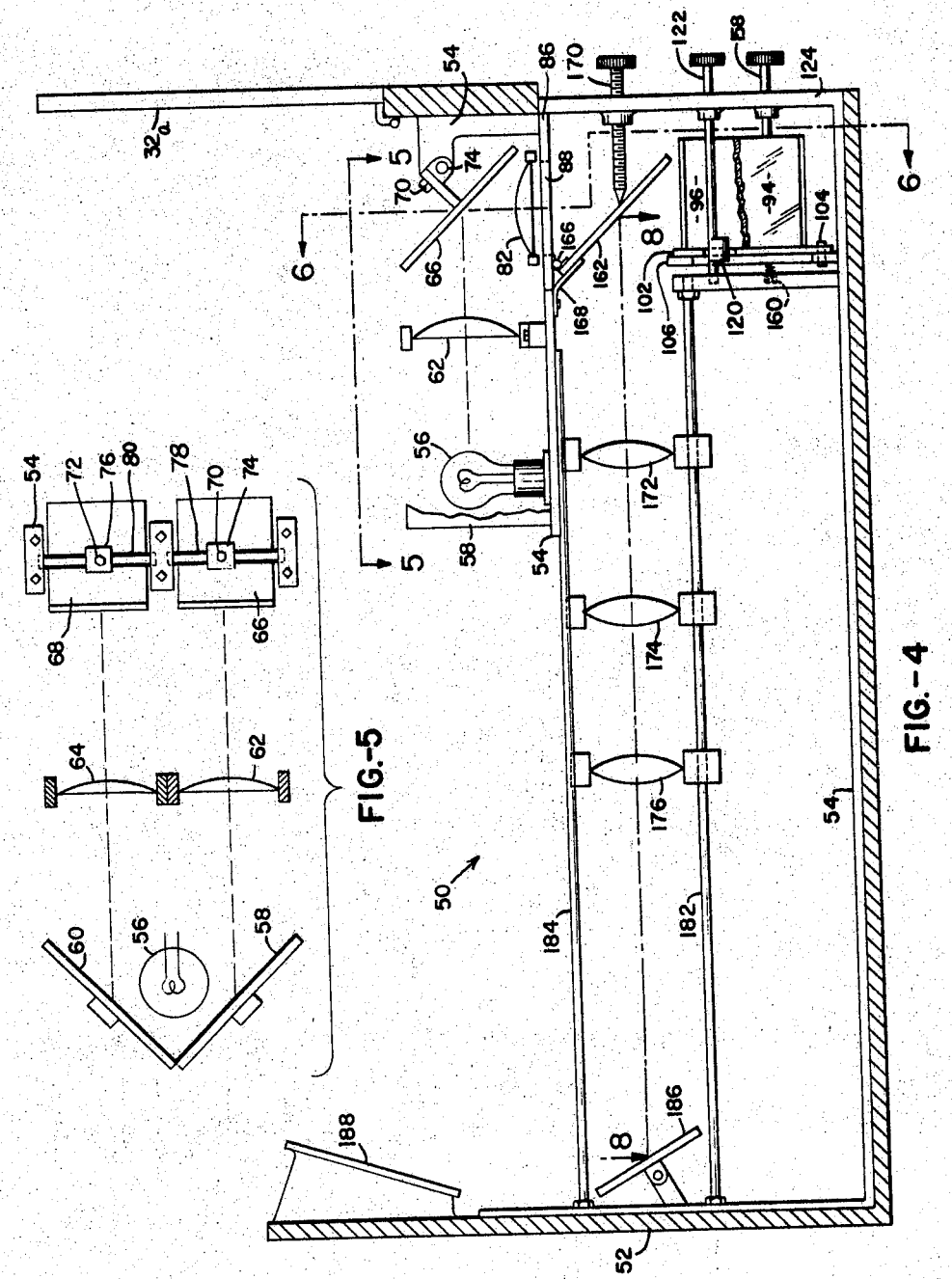

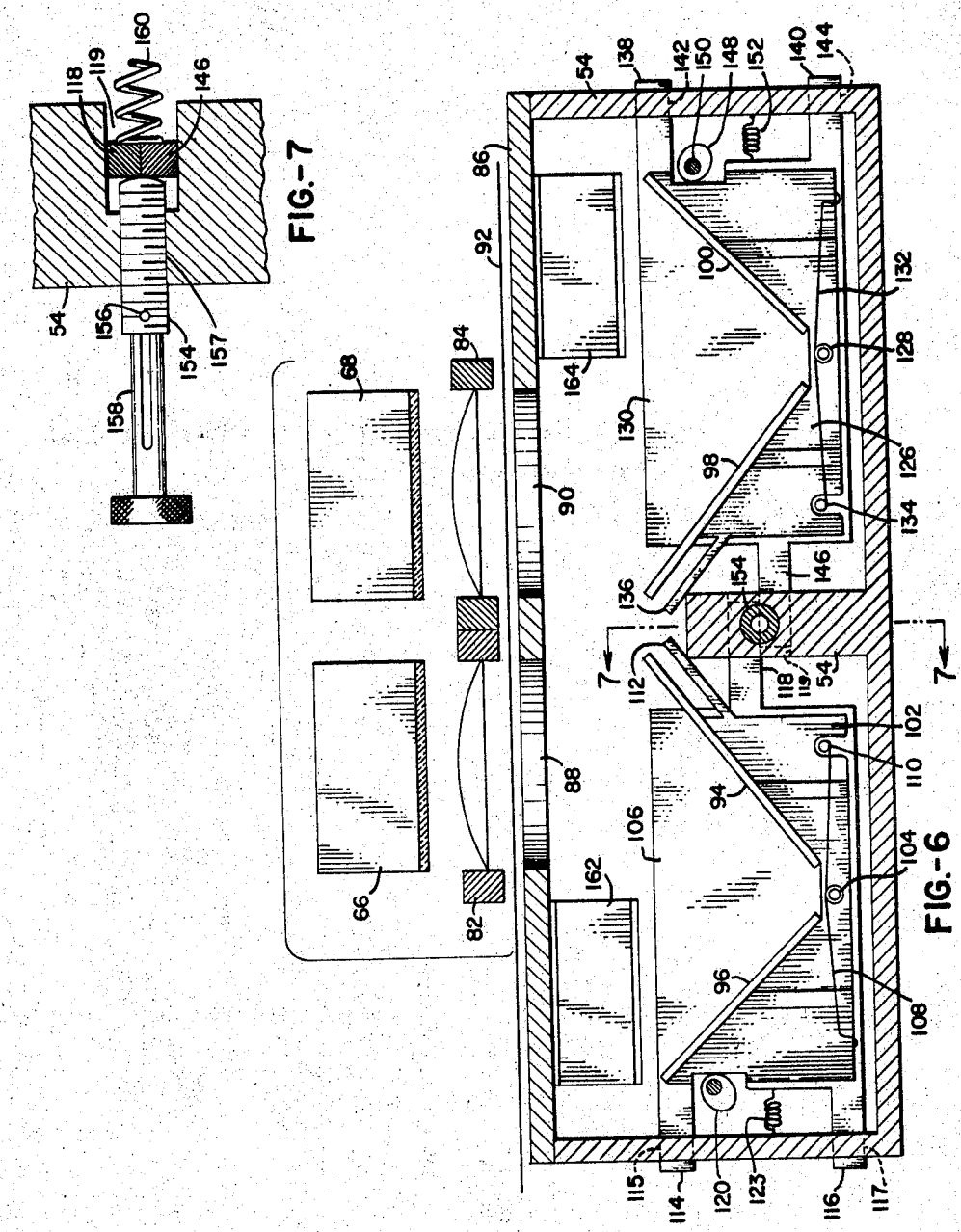

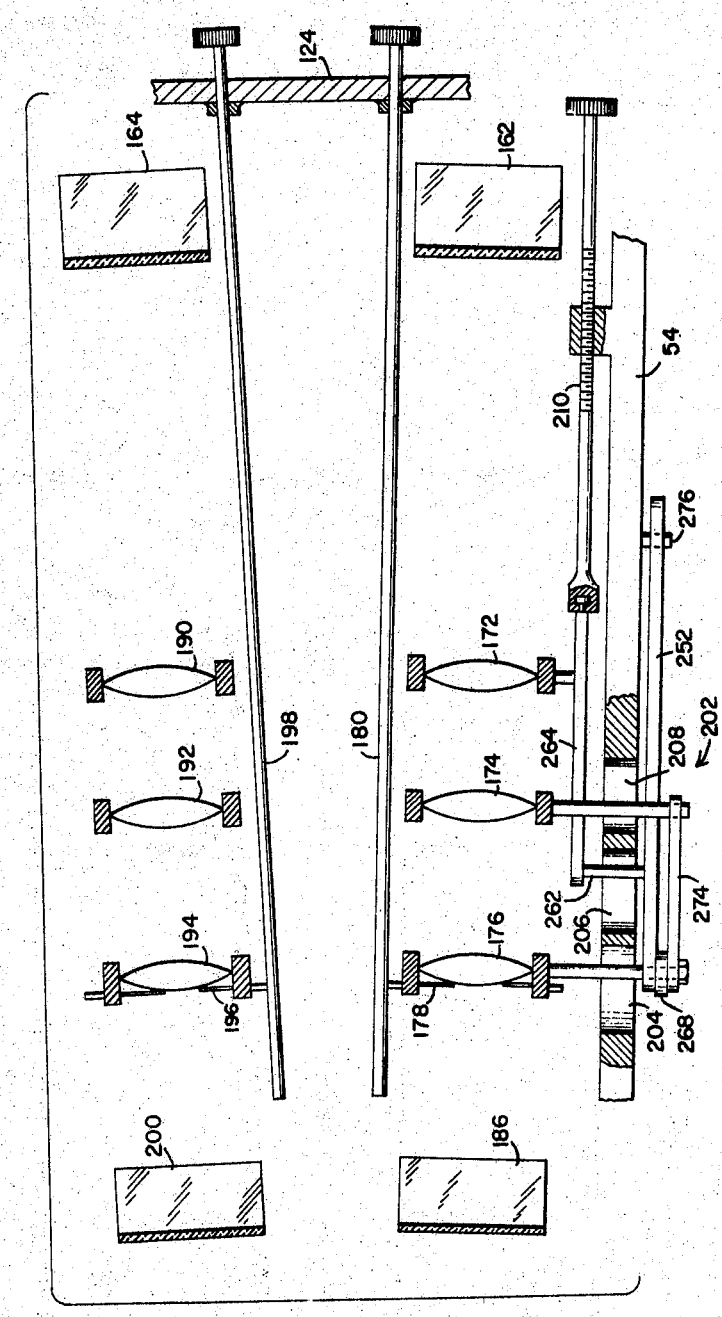

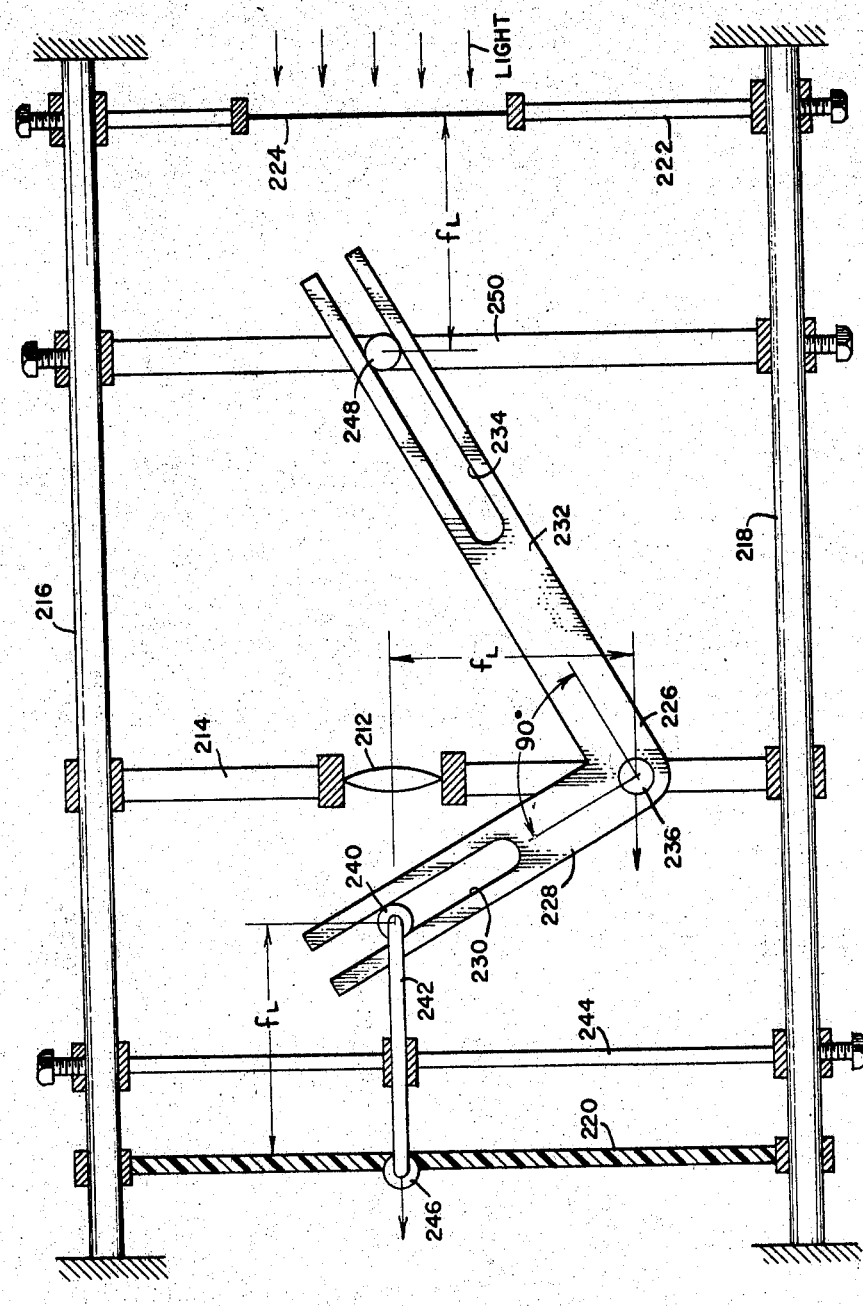

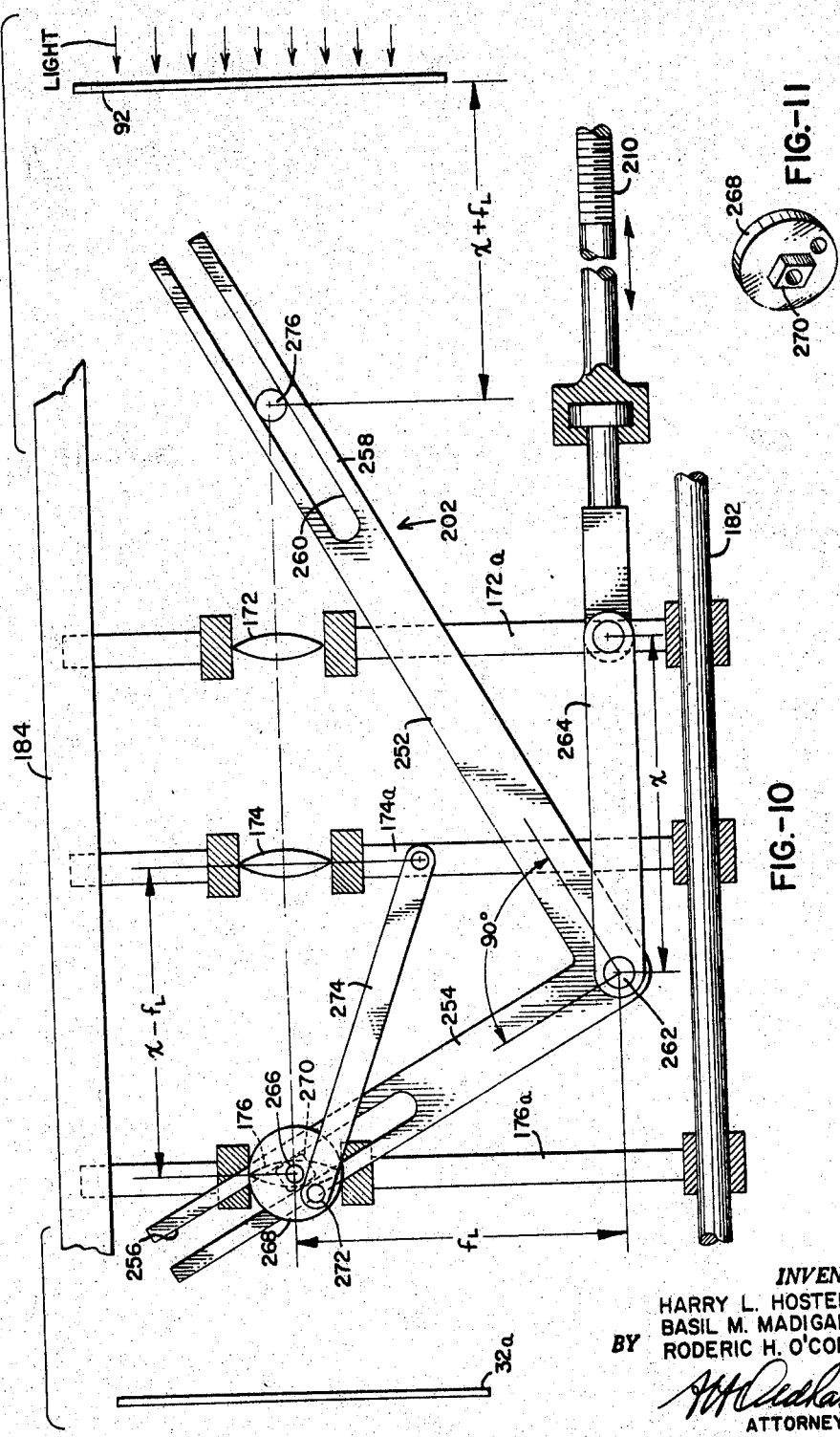

3,208,341
SCREEN FOR STEREO VIEWER
Harry L. Hosterman, Jr., Akron, Basil M. Madigan, Wadsworth, and Roderic H. O'Connor, Akron, Ohio, assignors to Goodyear Aerospace Corporation, a corporation of Delaware
Filed June 7, 1962, Ser. No. 200,729
1 Claim. (Cl. 88—28.93)

This invention relates to a stereo viewing system and, more particularly, to a back viewing stereo apparatus which includes a light selective composite screen and an adjustable light projection system.

Heretofore it has been known to project left and right stereographic views either simultaneously or alternately in substantially superimposed relation upon a composite image screen. One of the prior art composite screens contains alternate parts of opacity and transparency which separates the projected left and right stereographic views into a plurality of left and right image bands. This screen directs light from the independent left and right image portions so that the left and right eyes of an observer may see the left and right image bands respectively and exclusively. Some amount of three-dimensional perception is thus achieved.

Selective screens have been developed to resolve projected left and right stereographic views into left and right image bands. These screens contain optical structures having a lenticular shape. The rays of light that pass through the lenticular ridges form substantially independent vertical alternately disposed left and right image bands upon the screen. The effect is three-dimensional perception.

The contrast and resolution of the image obtained with these prior art stereo viewers are of low quality. The images are blurred and non-continuous. The viewers have limited image control characteristic and the view control characteristics are not coordinated with the optical characteristics of the screens. The screens have the disadvantage of being expensive and difficult to fabricate accurately.

It is the general object of the invention to avoid and overcome the foregoing and other difficulties of and objections to prior art practices by the provision of a relatively inexpensive, simplified and adjustable stereo viewer possessing apparent continuous three-dimensional images of high quality.

A further object of the invention is to provide a single-screen stereo imagery to an observer without the need for special glasses or filters in any of the viewing paths of the light.

Another object of the invention is to provide a stereo viewer with a linkage which functions to automatically focus the projected image.

Another object of the invention is to provide a stereo viewer which is capable of viewing varying amounts of image overlap.

Another object of the invention is to provide a stereo viewing system which has a screen which reproduces the projected scene with a large amount of resolution and contrast.

Another object of the invention is to provide a stereo viewer which permits the interpreter to move the images in X, Y, and Z directions and to rotate the image to equalize the Y parallex.

According to the invention, a light projecting optical system, having controls to alter the direction of the light rays in the X direction, the Y direction and to rotate the light rays to equalize the Y parallex, projects superimposed images upon a transparent light selective, composite screen. The optical system includes an automatic focusing linkage which enables the observer to enlarge one of the images in focus. The composite screen is formed from separate sheet members positioned in face to face relationship. One member is a Fresnel lens. The other member is a sheet of transparent film material having minute three-dimensional optical elements. Each element is a lens and functions to transmit light energy in a predictable direction. The composite screen directs the left and right stereographic image portions exclusively to the left and right eyes of the observer.

The exact nature of the invention as well as other objects and advantages thereof will be readily apparent from the consideration of the following specification relating to the annexed drawing in which:

FIGURE 1 is a diagrammatic view of a stereo viewing system according to the invention.

FIGURE 2 is a cross-sectional view of a portion of the viewing screen laminate.

FIGURE 3 is an enlarged cross section of the semi-specular sheet material of the screen laminate.

FIGURE 4 is a side view, partly in section, of the stereo viewing apparatus according to the invention.

FIGURE 5 is a plan view of the projected light source taken along the line 5—5 of FIGURE 4.

FIGURE 6 is a front elevation view, partly in section, of the stereo viewing apparatus taken along the line 6—6 of FIGURE 4.

FIGURE 7 is a sectional view of the mirror adjusting mechanism taken along the line 7—7 of FIGURE 6.

FIGURE 8 is a plan view of the optical system and optical adjusting mechanism of the stereo viewing apparatus taken along the axis of the lens, line 8—8 of FIGURE 4.

FIGURE 9 is a diagrammatic view of the basic linkage mechanism for automatic focusing an optical system.

FIGURE 10 is a diagrammatic view of the linkage mechanism for automatically focusing the lens system of the stereo viewing apparatus of FIGURE 8.

FIGURE 11 is a perspective view of the drive washer in the linkage mechanism of FIGURE 10.

Referring to the drawings, there is shown in FIG. a basic diagrammatic view of the stereo viewing system generally indicated by number 10. The system includes a pair of projectors 12 and 14. Projector 12 has a light source 16, a condensing lens system 18, and a lens 20. A positive transparency 22 is positionable in the projector between the condensing lens system 18 and the lens 20. The projector 14 includes a light source 24, condensing lens system 26, and a lens 28. A positive transparency 30 is positionable in the projector between the condensing lens system 26 and the lens 28. The positive transparencies 22 and 30 are stereo pairs.

The light projectors 12 and 14 are angularly positioned with respect to each other to project left and right stereo views in or near superimposed relationship upon an image screen 32. The composite screen 32 is positioned normal to the bisector of the angle formed by the light projector throw axes. The screen functions to direct the left and right stereographic image projected thereon exclusive to the left and right eyes respectively of an observer. The screen forms precisely defined audience spaces optical image formation. The audience space is determined by the viewing angle established by the screen.

As shown in FIGS. 2 and 3 the composite screen 32 formed from a Fresnel lens 36 and a semi-specular material 38. The Fresnel lens and semi-specular material are in face to face relationship and are supported and protected by rigid transparent members 40 and 42. The Fresnel lens and semi-specular material are sandwiched between the rigid and transparent members. The Fresnel lens functions as a field lens to direct the light to viewer from all parts of the screen. The Fresnel lens is a combination of small lens segments reduced to a flat plane.

The semi-specular screen material 38 as shown in FIG. 3 has a transparent film base 44 that has been treated to provide a three-dimensional pattern surface on one side. The patterned surface consists of minute geometric optical elements 46. There are approximately one million elements per square inch of material. Each element is a lens and functions to direct its transmitted light rays in a predictable direction. The pattern consists of adjacent minute lens elements, each element ranging between one and two thousandths of an inch in extent. The geometry of the elements control the size of the audience space by controlling the viewing angle. The elements may be shaped as pyramids, cones, cylinders, or four-sided pyramidal prisms. The enlarged cross section of the semi-specular material shown in FIG. 3 shows the surface of the material as having pyramidal geometric elements 46 of varying height separated by semi-spherical cavities 48. The geometric shape and size of the optical elements and the orientation of the individual elements are variables which control the directional characteristics of the screen to define specific audience spaces. The pattern shown in FIG. 3 is a random arrangement of varying height pyramidal geometric optical elements. This pattern of pyramidal geometric optic elements results in a viewing angle in the X direction of about ten degrees and an angle in the Y direction of about forty degrees. The resolution or breaking up and contrast characteristics of the semi-specular screen material is a function of the screen's surface granularity or pattern size.

Referring to FIG. 4, a back viewing stereo apparatus 50 is positioned in a rectangular container 52. The apparatus incorporates the principles of the stereo viewing system disclosed in FIG. 1. The screen 32a, pivotally secured to the front portion of the container 52, is substantially identical to the screen 32 of FIG. 1. The stereo apparatus is built on a skeleton frame 54 which is removably fastened in the container 52.

Referring to FIG. 5, the light source 56 of the apparatus is mounted in front of a pair of angularly disposed mirrors 58 and 60. The light rays emitting from the light source 56 are reflected by the mirrors 58 and 60 into two distinct paths through the condensing lens 62 and 64 into a pair of mirrors 66 and 68. The mirrors 66 and 68 are manually adjustable about their X and Y axes. Bolts 70 and 72 pivot the respective mirrors about the Y axis on brackets 74 and 76. These brackets are secured to rotatable shafts 78 and 80. The shafts 78 and 80 are frictionally held in a portion of the frame 54 to rotate the mirrors about their X axis. A pair of condensing lenses 82 and 84 are positioned in the reflected light paths of the adjustable mirrors 66 and 68.

As shown in FIG. 6 a film supporting plate 86 having a pair of horizontally spaced apertures 88 and 90 is mounted on the frame 54. The aperture 88 is positioned below the condensing lens 82 and the aperture 90 is positioned below the condensing lens 84. A stereo film 92 having positive stereo images is positioned on the supporting plate 86 and extends over the apertures 88 and 90.

A pair of angularly disposed left mirrors 94 and 96 are positioned below the aperture 88. A pair of angularly disposed right mirrors 98 and 100 are positioned below the aperture 90. The mirrors function to reflect the light rays projected through the transparent film into the optical systems of the viewer. Mirror 96 is secured to a vertically disposed plate 102 at an angle of 45 degrees with respect to the horizontal. The mirror 94 secured to the plate 102 at an angle of 38 degrees with respect to the horizontal. A pivot pin 104 extending through the plate 102 at a point established by the intersection of the planes of the mirrors rockably mounts the plate 102 on a guide plate 106. A left spring 108 extending over the pivot pin 104 engages the support plate 102 and a stop pin 110 to bias the plate 102 about the pivot pin 104. A cam rod 112 secured to the plate 102 in a plane substantially parallel to the plane of the mirror 94 engages a portion of the frame 54. The spring 108 functions to hold the cam rod 112 in engagement with the frame 54. The guide plate 106 has a three-point suspension engagement with the frame 54. A pair of vertically spaced and horizontally extending ears 114 and 116 engage slots 115 and 117 in frame 54. A single ear 118 extending in an opposite horizontal direction from the ears 114 and 116 is positioned in a slot 119 in a frame 54. The slots permit the guide plate to move in a horizontal direction and pivot about a vertical axis intersecting the ears 114 and 116. An eccentric cam 120 manually rotatable by shaft 122 engages the edge of the guide plate 106. Rotation of the cam urges the guide plate in a horizontal direction against the force of the tension spring 123. Movement of the guide plate 106 in a horizontal direction rotates the mirrors 94 and 96 by the interaction of cam rod 112 on the frame 54. This rotation prevents the mirror 94 from engaging the mirror 98. The manually rotatable shaft is supported at one end by the control panel 124 and at the other end by a portion of the frame 54.

The angularly disposed right mirrors 98 and 100 are secured to vertical plate 126. The mirror 98 is disposed at an angle of 38 degrees with respect to the horizontal and the mirror 100 is disposed at an angle of 45 degrees with respect to the horizontal. The plate 126 is pivotally mounted by pivot pin 128 to the vertical guide plate 130. The pivot pin 128 extends through the support plate 126 at a point defined by the intersection of the planes of the mirrors. A leaf spring 132 engages the support plate 126, extends over the pivot pin 128 and engages a stop pin 134 to rotatably bias the support plate. A cam rod 136 secured to the support plate 126 in a plane substantially parallel to the plane of the mirror 98 engages a portion of the frame 54. The leaf spring 132 biases the cam rod 136 against the frame 54.

The guide plate 130 has a three-point suspension on the frame 54. This suspension is provided by a pair of horizontally extending and vertically spaced ears 138 and 140 positioned in slots 142 and 144 in the frame 54 and a single horizontally extending ear 146. The ear 146 is positioned in the slot 119 in the same plane as the ear 118 of the guide plate 106. An eccentric cam 148 manually rotatable by shaft 150 engages the edge of the guide plate 130 to move the guide plate in a horizontal direction against the force of the tension spring 152. Movement of the guide plate 130 by the eccentric cam 148 in a horizontal direction rotates the mirrors 98 and 100 as a unit about the pivot pin 128. This rotation controlled by the engagement of the cam rod 136 with the housing 54 prevents the mirror 98 from interfering with the mirror 94.

The pair of right mirrors and the pair of left mirrors simultaneously rotate on vertical axes in an opposite sense. As shown in FIG. 7, a hollow set screw 154 having a transverse pin 156 extends through the housing 54 in a threaded bore 157 and engages the ears 118 and 146 of the guide plates 106 and 130. A manually rotatable slotted shaft 158 mounted on the control panel 124 is used as a tool to rotate the screw 154. A compression spring 160 engages the ears 118 and 146 and a frame 54 to urge the ears in engagement with the end of the screw 158. The ears 118 and 146 follow the movement of the screw 158.

A left mirror 162 and a right mirror 164 is pivotally mounted to the frame 54 above the mirrors 96 and 100 respectively. The mirror 162 shown in FIG. 4 is pivotally mounted on the frame 54 by a hinge 166. The mirror is pivoted on a horizontal axis transverse to the axis of the optical system. A leaf spring 168 in engagement with a portion of the mirror urges the mirror against an adjustable screw 170 mounted in the control panel 124. The angular position of the mirror 162 is controlled by the adjustable screw 170. The mirror 164 is mounted on the frame 54 and controlled in the same manner as the mirror 162.

Referring to FIGS. 4 and 8, the left optical system includes a first lens 172, a field lens 174, and a second lens 176. The second lens 176 contains an adjustable diaphragm 178 which is controlled by a manually rotatable splined shaft 180 having a portion mounted in the control panel 124. The horizontally extending support rod 182 secured to the frame 54 mounts the lenses. A guide rail 184 positioned above the lenses guides the lenses along the supporting rod. A mirror 186, secured to the frame 54, is positioned in alignment with the axis of the lens and directs the light projecting through the lens onto a mirror 188. The mirror 188 directs the light to the screen 32a. The mirrors 186 and 188 function to back project the light toward the operator of the control panel.

The right optical system shown in FIG. 8 includes a first lens 190, a field lens 192, and a second lens 194. The second lens contains an adjustable diaphragm 196 that is controlled by a manually rotatable splined shaft 198 supported by the control panel 124. The left optical system directs the light rays to the mirror 200. The mirror 200 reflects the light rays into the mirror 188.

The left optical system includes an automatic lens focusing linkage 202. The linkage 202 is positioned in horizontal slots 204, 206, and 208. A manually rotatable threaded rod 210 connected to a portion of the linkage controls the horizontal movement thereof. The automatic focusing linkage enables the viewer to control the superimposed size relationship of the projected image.

FIG. 9 shows the basic linkage mechanism for automatic focusing a simple optical system. The system includes a lens 212 positioned in a lens support 214. The lens support is slidably mounted on guide rails 216 and 218 which extend parallel to the axis of the lens. A screen 220 extending in a plane normal to the axis of the lens is slidably mounted on the guide rails 216 and 218. A film holder 222 positions a film 224 in alignment with the lens axis and in a plane normal thereto. Light passing through the film projects an image on the screen 220 which is focused by the lens 212.

The linkage mechanism comprises a bell crank 226 having a 90 degree included angle. The arm 228 of the bell crank has a longitudinal extending slot 230 and the arm 232 of the bell crank has a longitudinally extending slot 234. A pivot pin 236 extending in the plane of the lens and in a plane parallel to the axis of the lens pivotally secures the apex of the bell crank to the lens frame. The pivot plane parallel to the axis of the lens is offset from the axis of the lens a distance equal to the focal length ($F_L$) of the lens.

A second pivot pin 240 positioned in the plane of the lens and extending normal thereto engages the slot 230 of the arm 228 of the bell crank. The pivot pin is rigidly secured to the screen 220 by a link 242. The pivot pin 240 is spaced from the screen toward the lens a distance equal to the focal length ($F_L$) of the lens. The link 242 is slidably positioned in a support 244 for movement parallel to the axis of the lens. The link 242 is connected to the screen at 246 so that the screen and link move as a unit.

A third pivot pin 248 engages the slot 234 of the arm 232 of the crank. Pivot pin 248 is positioned in the plane of the axis of the lens and extends normal thereto. The pivot pin 248 extends parallel to pivot pins 236 and 240. A support 250 positions the pivot pin 248 from the film 224 toward the lens 212 a distance equal to the focal length ($F_L$) of the lens.

The linkage functions to keep the image projected on the screen in focus when the size of the image thereon is changed. Movement of the lens along the guide rails 216 and 218 changes the distance between the lens and the film. The linkage moves the screen 220 along the axis of the lens relative to the plane of the lens and the plane of the film to keep the image projected on the screen in focus.

Automatic focusing linkage system 202 shown in FIGS. 8 and 10 includes the basic linkage mechanism shown in FIG. 9. A bell crank 252 having a first arm 254 containing a longitudinally extending slot 256 and a second arm 258 having a longitudinally extending slot 260 is positioned in a plane parallel to the axis of the lens. The arms are angularly separated by a 90 degree included angle. A first pivot pin 262 pivotally mounts the apex of the bell crank 252 on the frame 54. The pivot pin 262 is positioned in a plane perpendicular to the axis of the first lens 172 and offset from the plane of said lens by a distance X. The pivot plane parallel to the axis of the lens is offset from the axis of the lens a distance equal to the focal length ($F_L$) of the lens. A horizontally extending link 264 rigidly connects the pivot pin 262 with the first lens housing 72a. The frame 54 restricts movement of the link 264 to a direction which is parallel to the axis of the first lens 72. The manual control member 210 provides the linkage with axial movement.

A second pivot pin 266 is positioned in the plane of the second lens 176 and is secured to the lens housing 176a. The slot 204 in the frame 54 limits the movement of the pin 266 in a horizontal direction parallel to the axis of the lens. A drive washer 268 having a square portion 270, as shown in FIG. 11, is rotatably mounted on the outer end of the pin 266. The edges of the slot 256 engage the square portion of the drive washer so that movement of the arm 254 will rotate the washer 268. A pitman pin 272 on the washer 268 connects the link 274 thereto. The link 274 is pivotally connected to the field lens housing 174a. The length of the link 274 is such that the distance between the plane of the second lens 176 and the plane of the field lens 174 is equal to the distance X that the pivot point 262 is offset from the plane of the first lens 174 minus the focal length ($F_L$) of the first lens 172.

A third pivot pin 276 is secured to the frame 54. The pivot pin 276 is positioned in the horizontal plane of the axis of the lens and extends normal to said axis and parallel to the pivot pins 262 and 266. The pivot pin 276 is spaced from the film toward the first lens 172 a distance equal to the focal length of said lens plus the distance X which is the distance that the apex pivot pin 262 is behind the plane of the first lens 172.

To summarize the operation of the back viewing stereo apparatus the light rays will be traced from the light source 56 to the screen 32a. As shown in FIGS. 4 and 5 the light emitted from the light source 56 is reflected into two separate paths by the angularly disposed mirrors 58 and 60. The separate light energy rays pass through the condensing lens 62 and 64 and are reflected downward by mirrors 66 and 68 through the condensing lens 82 and 84. As shown in FIG. 6 the light reflected from the mirrors 66 and 68 passes downward through the stereo pairs on the film 92 and the apertures 88 and 90 onto the left and right-hand pair of angularly disposed mirrors 94, 96, and 98, 100. These mirrors reflect the light energy up into a pair of mirrors which direct the separated light energy through the left and right optical systems respectively. After the light energy egresses from the optical systems it is reflected by mirrors 186, 188, and 200 to the screen 32a.

The stereo viewer permits the interpreter to move the images independently in the X direction and therefore control the amount of image overlap. This is accomplished by the rotation of either or both cam 120 and 148. The rotation of the cams moves the angularly disposed mirrors in a horizontal direction. The images may be moved in the Y direction by adjusting the angular position of the mirrors 162 and 164. This is accomplished by operation of the screw 170 shown in FIG. 4.

The rotation of the left and right pair of angularly disposed mirrors 94, 96, and 98, 100 about their respective vertical axes is accomplished by the movement of the screw means 154 shown in FIG. 7. This rotation rotates the images on the screen. The rotation of the images on the screen results in the equalization of the Y parallex.

While there have been shown, described, and pointed out the fundamental novel features of the invention as applied to the preferred embodiment, it will be understood that various omissions, substitutions, changes in form, and details of the apparatus illustrated may be made by those skilled in the art, without departing from the spirit of the invention. It is intended to be limited only as indicated by the scope of the following claim.

What is claimed is:

In an optical screen adapted to receive projected superimposed images so that the images will be viewable in stereoscopic relief, the combination of
- a transparent plastic sheet having one side treated to provide a three-dimensional pattern surface which consists of geometric optical elements ranging between about one and about two thousandths of an inch in extent, said elements being of pyramidal geometric shape and of varying height and arranged at random, said elements adapted to transmit incident light rays in a predictable direction,
- a flat Fresnel lens positioned in face to face relation with the treated surface of said transparent sheet and adapted to direct the light passed through said transparent sheet, and
- a pair of rigid transparent members operatively secured to the outsides of the Fresnel lens and the transparent sheet for support and protection thereof.

References Cited by the Examiner

UNITED STATES PATENTS

| | | | |
|---|---|---|---|
| 2,150,225 | 3/39 | Kaszab | 88—28.93 |
| 2,260,228 | 10/41 | Moller et al. | |
| 2,529,701 | 11/50 | Maloff | 88—28.93 |
| 2,589,014 | 3/52 | McLeod | 352—139 |
| 2,700,322 | 1/55 | Gruber | 88—27 |
| 2,726,573 | 12/55 | Maloff | 88—28.93 |
| 2,823,580 | 2/58 | Gannett | 88—24 |
| 2,891,444 | 6/59 | Ewald | 88—29 |
| 2,987,961 | 6/61 | Cotton et al. | 88—84 |
| 3,037,423 | 6/62 | Schurcliff | 88—26 |

JULIA E. COINER, *Primary Examiner.*